3,457,349
ESTERS OF 1-AZIRIDINEPROPIONIC ACID AS TRANQUILIZERS
Arthur G. Jelinek, Wilmington, Del., assignor to E. I. du Pont de Nemours and Company, Wilmington, Del., a corporation of Delaware
No Drawing. Filed Nov. 19, 1963, Ser. No. 324,887
Int. Cl. A61k 27/00; C07d 23/02
U.S. Cl. 424—244      15 Claims This invention relates to derivatives of 1-aziridinepropionic acid. More particularly, this invention refers to a novel class of compounds having outstanding and unobvious pharmaceutical properties.

The disclosure herein should not be taken as a recommendation to use the disclosed invention in any way without full compliance with U.S. Food and Drug laws and other laws and governmental regulations which may be applicable.

According to the present invention, I have discovered a novel class of compounds which have remarkable activity as central nervous system depressants. This term is used in its ordinary meaning and is intended to include within its purview associated effects such as muscle relaxant activity as well as ataractic or tranquilizing activity.

The compounds of this invention are characterized by high activity even at very low dosages. Compared with other related compounds, the compounds of this invention have surprisingly high therapeutic ratios.

The compounds which I have discovered are novel derivatives of 1-aziridinepropionic acid. The compounds have the formula

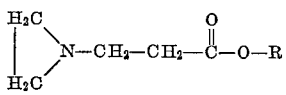

where R is an aryl, alicyclic, heterocyclic, substituted alkyl or unsaturated aliphatic substituent.

When R is aryl, such groups are included as phenyl, naphthyl, anthryl and phenanthryl, of which phenyl is preferred.

When R is alicyclic, monocyclic and bicyclic groups of 3 through 8 carbons are included in the ring or rings. Typical are cycloalkyl and cycloalkenyl each of 3 through 8 carbons in the ring. Cyclopropyl, cyclopentyl and especially cyclohexyl are the preferred cycloalkyl groups. Cyclohexenyl is the preferred cycloalkenyl group.

When R is heterocyclic, monocyclic and bicyclic groups are included. The heterocyclic radical can contain 1 or 2 hetero atoms such as nitrogen, oxygen and sulfur, in addition to carbon atoms. Each ring can contain a total of 5 or 6 atoms. The heterocyclic ring or rings can be saturated as when R is a dioxane, pyrrolidine or morpholine grouping, or unsaturated as when R is a dioxene, pyridine or furan grouping.

When R is substituted alkyl, the alkyl portion can be straight or branched chain and have 1 through 22, preferably 1 through 12, and most preferably 1 through 6 carbons. The substituents on the alkyl group can be one or more of one or more such members as aryl as defined above; aryloxy where the aryl portion is as defined above; alicyclic as defined above; heterocyclic as defined above; halogen, including chlorine, bromine and fluorine; nitro; alkylthio of 1 through 6 and preferably 1 or 2 carbons; alkoxy of 1 through 6 and preferably 1 or 2 carbons; carboalkoxy where the alkoxy portion has 1 through 6 and preferably 1 or 2 carbons; alkylsulfonyl of 1 through 6 and preferably 1 or 2 carbons; cyano; amino; monoalkylamino of 1 through 4 carbons; and dialkylamino where each alkyl has 1 through 4 carbons. When the alkyl substituent is aryl, alicyclic or heterocyclic, it is preferred that the alkyl chain have 1 through 6, and most preferably 1 through 2 carbons.

When R is unsaturated aliphatic, it can be singly or multiply unsaturated such as alkenyl or alkynyl each of from 2 through 22, preferably from 2 through 12, and most preferably from 2 through 6 carbons. R in this case can be straight or branched chain and can be unsubstituted or substituted with one or more substituents indicated above for substituted alkyl.

In each of the above cyclic R substituents, the ring or rings can be unsubstituted or substituted with 1, 2 or 3 of one or more of such members as alkyl of 1 through 4 carbons; alkoxy of 1 through 4 carbons; halogen including chlorine, bromine and fluorine; alkylthio of 1 through 4 carbons; alkylsulfonyl of 1 through 4 carbons; carboalkoxy where the alkoxy portion has 1 through 6 and preferably 1 through 2 carbons; haloalkyl where the halo can be one or more chlorine, bromine or fluorine and the alkyl has 1 through 4 carbons; amino; mono-substituted amino and di-substituted amino where the substituents can each be alkyl of 1 through 4 carbons or haloalkyl as just defined; nitro; cyano; and acetoxy where the aliphatic moiety has 1 through 6 and preferably 1 through 2 carbons.

The above compounds are made by the addition of ethylene imine to the appropriate acrylic acid ester. The formula for this acrylic acid ester is $CH_2=CH-COOR$ where R is as defined above. Reaction conveniently takes place at a temperature of 10° to about 100° C. and preferably below about 40° or 50° C., for 2 to 48 hours reaction time. The reaction generally proceeds satisfactorily without a solvent but if desired, a solvent medium such ethanol, benzene, xylene or the like can be used. If desired, a strong basic catalyst such as p-butoxide or a quaternary hydroxide such as benzyl trimethyl ammonium hydroxide can be used.

Stable, pharmacologically acceptable salts, e.g., citrate, tartrate, pamoate, etc., of the above compounds are contemplated to be within the purview of the present invention and are considered to be obvious equivalents of the present claimed invention.

In the practice of this invention, the active pharmaceutical agent may be administered alone but are generally administered with a pharmaceutical carrier selected on the basis of the chosen route of administration and standard pharmaceutical practice. For example, they may be administered orally in the form of tablets or capsules containing such excipients as starch, milk sugar, certain types of clay, etc. They may be administered orally in the form of elixirs or oral suspensions which may contain coloring and flavoring agents. They may be injected parenterally and for this use may be prepared in the form of sterile aqueous solutions containing other solutes such as saline or glucose in sufficient quantity to make the solution isotonic. For intramuscular administration compositions of the compounds of this invention may be prepared in an oil base such as a peanut or sesame oil.

The pharmaceutical agents within the scope of this invention will generally be administered in the range of 0.5 to 500 milligrams per day and preferably 2 to 200 milligrams per day. However, in general, the physician or veterinarian will of course determine the dosage which will be most suitable for a particular application, and as might be expected, it will vary with the age, weight and general health of the patient under treatment and with various other factors which will be determined by the physician or veterinarian in attendance. When they are administered orally a larger quantity will be required to produce the same effect as a smaller quantity given parenterally. Parenteral administration of from 0.1 mg. to 250 mg. of active agent should be suitable to obtain some effect. Administration can also be by vapor or spray through the mouth or nasal passages.

The compositions of this invention may take a variety of forms. Various diluents may be employed and the percentage of active ingredients may be varied. It is necessary that an active ingredient form a proportion of the composition such that a suitable dosage form will be obtained. Obviously, several dosage unit forms may be administered at about the same time. Although compositions with less than 0.005% by weight of active ingredient are suitable, it is preferred to use compositions containing not less than 0.005% of the active agent because otherwise the amount of carrier becomes excessively large. Activity increases with the concentration of the active agent. The percentage by weight of active agent may be 10, 50, 75, 95% or even higher. Dosage unit forms may be prepared with a minor proportion of a carrier and a major proportion of active materials and vice-versa.

The following examples are given solely for the purpose of illustration and are not to be construed as limitations of this invention, many variations of which are possible without departing from the spirit or scope thereof.

Example 1

A mixture of 4.3 grams (0.1 mole) of ethylene imine and 3 drops of a 35% methanol solution of benzyl trimethyl ammonium hydroxide is added dropwise to 15.4 grams (0.1 mole) of 2,2,2-trifluoroethyl acrylate while maintaining a temperature of about 40° C. by occasional cooling with an ice bath. After the addition the reaction mixture is heated for one hour at about 45° C. Distillation of the product through a 15-inch Vigreux column gives 12.3 grams (63% yield) of 1-aziridinepropionic acid, 2,2,2-trifluoroethyl ester, B.P. 62–63° C./8 mm.

According to the procedure of Example 1, the following exemplary compounds can be prepared from the appropriate selected acrylate.

Example No.: Product
2 _____ 1-aziridinepropionic acid, 2,2,2,2,2,2-hexafluoroisopropyl ester.
3 _____ 1-aziridinepropionic acid, 6-chlorohexyl ester.
4 _____ 1-aziridinepropionic acid, 2-nitroethyl ester.
5 _____ 1-aziridinepropionic acid, 2-bromoethyl ester.

Example 6

A mixture of 6.5 grams (0.15 mole) of ethylene imine and 3 drops of benzyl trimethylammonium hydroxide is added dropwise to 25.6 grams (0.15 mole) of diethylaminoethyl acrylate with stirring while maintaining a temperature of about 35° C. by cooling with an ice bath. After the addition the reaction mixture is heated for 30 minutes at about 50° C. Distillation of the product through a 15-inch Vigreux column gives 21.1 grams of a colorless liquid 1-aziridinepropionic acid, 2-diethylaminoethyl ester, B.P. 72–73° C./0.1 mm.

According to the procedure of Example 6, the following exemplary compounds can be prepared from the appropriate selected acrylate.

Example No.: Product
7 _____ 1-aziridinepropionic acid, 1-diethylamino-3-methoxy-2-propyl ester.
8 _____ 1-aziridinepropionic acid, 1-dibutylamino-2-propyl ester.

Example 9

A mixture of 10.1 grams (0.235 mole) of ethylene imine and 3 drops of benzyl trimethyl ammonium hydroxide is added dropwise to 39 grams (0.25 mole) of cyclohexyl acrylate with stirring while maintaining a temperature of about 35° C. by cooling with an ice bath. After the addition the reaction mixture is heated for 1 hour at about 50° C. After removal of a short forecut, distillation of the product through a 15-inch Vigreux column gives 37.2 grams of a colorless liquid 1-aziridinepropionic acid, cyclohexyl ester, B.P. 102–103° C./2.5 mm.

According to the procedure of Example 9, the following exemplary compounds can be prepared from the appropriate selected acrylate.

Example No.: Product
10 _____ 1-aziridinepropionic acid, cyclopentyl ester.
11 _____ 1-aziridinepropionic acid, 1 - phenylcyclohexyl ester.
12 _____ 1-aziridinepropionic acid, 2-methyl-1-cyclohexyl ester.

Example 13

A mixture of 10.1 grams (0.235) of ethylene imine and 3 drops of benzyl trimethyl ammonium hydroxide is added dropwise to 41 grams (0.25 mole) of benzyl acrylate with stirring while maintaining a temperature of about 35° C. by cooling with an ice bath. After the addition the reaction mixture is heated for 1 hour at about 50° C. After removal of a short forecut, distillation of the product through a 15-inch Vigreux column gives 40.4 grams of a colorless liquid 1-aziridinepropionic acid, benzyl ester, B.P. 98° C./0.2 mm.

According to the procedure of Example 13, the following exemplary compounds can be prepared from the appropriate selected acrylate.

Example No.: Product
14 _____ 1-aziridinepropionic acid, 2 - phenoxyethyl ester.
15 _____ 1-aziridinepropionic acid, benzhydryl ester.
16 _____ 1 - aziridinepropionic acid, 4,4' - dimethoxybenzhydryl ester.
17 _____ 1-aziridinepropionic acid, 5 - norbornene-2-methyl ester.
18 _____ 1-aziridinepropionic acid, exo-norbornyl ester.

Example 19

A mixture of 10.1 grams (0.235 mole) of ethylene imine and 3 drops of benzyl trimethyl ammonium hydroxide is added dropwise to 32 grams (0.25 mole) of 2-methoxyethyl acrylate with stirring while maintaining a temperature of 35–40° C. by cooling with an ice bath. After the addition the reaction mixture is heated for 1 hour at about 55° C. After removal of a short forecut, distillation of the product through a 15-inch Vigreux column gives 14.3 grams of a colorless liquid 1-aziridinepropionic acid, 2-methoxyethyl ester, B.P. 82–83° C./2.1 mm.

According to the procedure of Example 19, the following exemplary compounds can be prepared from the appropriate selected acrylate.

Example No.: Product
20 _____ 1-aziridinepropionic acid, 2 - acylyloxyethyl ester.
21 _____ 1-aziridinepropionic acid, 2 - acetoxyethyl ester.
22 _____ 1-aziridinepropionic acid, 4-methoxy-1-naphthyl ester.

Example 23

To a mixture of 4.3 grams (0.1 mole) of ethylene imine and 3 drops of benzyl trimethyl ammonium hydroxide is added dropwise 18.6 grams (0.1 mole) of 2,2,3,3-tetrafluoropropyl acrylate with stirring while maintaining a temperature of about 40° C. by cooling with an ice bath. After the addition the reaction mixture is heated for 1 hour at about 50° C. After removal of a short forecut, distillation of the product through a 15-inch Vigreux column gives 12.5 grams of a colorless liquid 1-aziridinepropionic acid, 2,2,3,3-tetrafluoropropyl ester, B.P. 72–73° C./3.0 mm.

According to the procedure of Example 23, the following exemplary compounds can be prepared from the appropriate selected acrylate.

Example No.: Product
24 _____ 1-aziridinepropionic acid, phenyl ester.
25 _____ 1-aziridinepropionic acid, thymyl ester.

Example 26

To a mixture of 31.2 grams (0.25 mole) of 2-cyanoethyl acrylate and 0.5 gram of hydroquinone as a stabilizer is added dropwise a mixture of 10.8 grams (0.25 mole) of ethylene imine and (0.1 gram) about 5 drops) of potassium tert-butoxide. The mixture is allowed to warm to room temperature and then heated for 3 hours at about 50° C. Half of the mixture is stripped at 10 mm. and 50° C. to remove unreacted ingredients. The product is 18.8 grams of a moderately viscous liquid 1-aziridinepropionic acid, 2-cyanoethyl ester.

According to the procedure of Example 26, the following exemplary compounds can be prepared from the appropriate selected acrylate.

Example No.: Product
27 _____ 1 - aziridinepropionic acid, 2 - nitrobutyl ester.
28 _____ 1-aziridinepropionic acid, 2 - carboethoxyethyl ester.
29 _____ 1-aziridinepropionic acid, 3 - chlorophenyl ester.
30 _____ 1-aziridinepropionic acid, 3,4-dichlorophenyl ester.
31 _____ 1 - aziridinepropionic acid, 2,3,6 - trichlorophenyl ester.

Example 32

A mixture of 6.5 grams (0.15 mole) of ethylene imine, 3 drops of benzyl trimethyl ammonium hydroxide and 5 drops of potassium tert-butoxide is added dropwise to 23.6 grams (0.14 mole) of acrylic acid, ester with 3-hydroxy-N-methylpiperidine. The temperature rises to about 33° C. The mixture is heated for about 8 hours at 55–60° C. and then for about 15 hours at 70–75° C. Distillation of the product through a 15-inch Vigreux column gives 12.7 grams of colorless liquid 1-aziridinepropionic acid, ester with 3-hydroxy-N-methylpiperidine, B.P. 83° C./0.2 mm.

According to the procedure of Example 32, the following exemplary compounds can be prepared from the appropriately selected acrylate.

Example No.: Product
33 _____ 1-aziridinepropionic acid, alpha-cyclopropyl-2-thiophenemethyl ester.
34 _____ 1 - aziridinepropionic acid, 2 - hexamethyleneiminoethyl ester.
35 _____ 1-aziridinepropionic acid, 1 - morpholino-2-propyl ester.
36 _____ 1-aziridinepropionic acid, 1 - pyrrolidylpropyl ester.
37 _____ 1-aziridinepropionic acid, 2 - pyridyl ester.
38 _____ 1-aziridinepropionic acid, 1,4 - benzodioxan-2-methyl ester.
39 _____ 1-aziridinepropionic acid, 2-phthalimidoethyl ester.
40 _____ 1-aziridinepropionic acid, 3 - quinuclinidyl ester.

Example 41

A mixture of 3.9 grams (0.09 mole) of ethylene imine, 3 drops of benzyl trimethyl ammonium hydroxide and about 4 drops of potassium tert-butoxide is added dropwise to 28.2 grams (0.09 mole) of 2,2,3,3,4,4,4-heptafluorobutyl acrylate with stirring while maintaining a temperature of about 35° C. by cooling with an ice bath. After the addition the reaction mixture is heated for 4 hours at about 50° C. After removal of a short forecut, distillation of the product through a 15-inch Vigreux column gives 14.3 grams of a colorless liquid 1-aziridinepropionic acid, 2,2,3,3,4,4,4-heptafluorobutyl ester, B.P. 54–55° C./2.2 mm.

According to the procedure of Example 41, the following exemplary compounds can be prepared from the appropriately selected acrylate.

Example No.: Product
42 _____ 1-aziridinepropionic acid, cyclopropylmethyl ester.
43 _____ 1-aziridinepropionic acid, omega-fluorododecyl ester.
44 _____ 1-aziridinepropionic acid, omega-fluorooctadecyl ester.
45 _____ 1-aziridinepropionic acid, 2-cyclohexylethyl ester.

Example 46

A mixture of 6.5 grams (0.15 mole) of ethylene imine, 3 drops of benzyl trimethyl ammonium hydroxide and 5 drops of potassium tert-butoxide is added dropwise to 21.4 grams (0.15 mole) of 2-dimethylaminoethyl acrylate with stirring while maintaining a temperature of about 35° C. by cooling with an ice bath. After the addition the reaction mixture is heated for 1 hour at about 50° C. After removal of a short forecut, distillation of the product through a 15-inch Vigreux column gives 17.8 grams of a colorless liquid 1-aziridinepropionic acid, 2-dimethylaminoethyl ester, B.P. 59° C./0.15 mm.

According to the procedure of Example 46, the following exemplary compounds can be prepared from the appropriately selected acrylate.

Example No.: Product
47 _____ 1-aziridinepropionic acid, geranyl ester.
48 _____ 1-aziridinepropionic acid, propargyl ester.
49 _____ 1-aziridinepropionic acid, m-dimethyl aminophenyl ester.

Example 50

To a mixture of 6.7 grams (0.15 mole) of ethylene imine, 3 drops of benzyl trimethyl ammonium hydroxide and 5 drops of potassium tert-butoxide is added dropwise 21.8 grams (0.15 mole) of 2-methylthioethyl acrylate with stirring while maintaining a temperature of about 35° C. by cooling with an ice bath. After the addition the reaction mixture is heated for 2 hours at about 55° C. After removal of a short forecut, distillation of the product through a 15-inch Vigreux column gives 8.4 grams of a colorless liquid 1-aziridinepropionic acid, 2-methylthioethyl ester, B.P. 76–79° C./0.3 mm.

According to the procedure of Example 50, the following exemplary compounds can be prepared from the appropriately selected acrylate.

Example No.: Product
51 _____ 1-aziridinepropionic acid, allyl ester.

Example 52

A mixture of 8.6 grams (0.2 mole) of ethylene imine and 3 drops of benzyl trimethyl ammonium hydroxide is added dropwise to 40.8 grams of 2,2,3,3,3-pentafluoropropyl acrylate with stirring while maintaining a temperature of about 30° C. by cooling with an ice bath. After the addition the reaction mixture is heated for 3 hours at about 30° C. After removal of a large forecut, distillation of the product through a 15-inch Vigreux column gives a 15.5 grams of a colorless liquid 1-aziridinepropionic acid, 2,2,3,3,3-pentafluoropropyl ester, B.P. 60° C./6 mm.

According to the procedure of Example 52, the following exemplary compounds can be prepared from the appropriately selected acrylate.

| Example No.: | Product |
|---|---|
| 53 | 1-aziridinepropionic acid, p-fluorophenyl ester. |
| 54 | 1-aziridinepropionic acid, 3-methylnorcamphane-2-methyl ester. |

The above examples can be repeated to prepare other compounds within the scope of this invention by selection of appropriate reactants in accordance with the teachings herein. The products can be formulated and used according to the following examples where the active ingredient is a compound of the present invention.

Example 55

A large number of unit capsules are prepared for oral administration by mixing the following ingredients:

| | Parts by weight |
|---|---|
| 1-aziridinepropionic acid, 2,2,2-trifluoroethyl ester | 2,000 |
| Lactose U.S.P. | 7,950 |
| Dry pyrogenic silica $SiO_2$ with particle size of 0.015 micron, surface area of 200 m.$^2$/gm., and bulk density of 2.2 lbs./cu. ft. ("Cabosil," Cabot Corp.) | 50 |

After mixing, the mixture is screened through a 40 mesh screen and encapsulated in No. 3 two-piece hard gelatin capsules.

Example 56

The active ingredient of Example 55 (20 parts by weight) is dispersed in 100 parts by volume of corn oil and encapsulated in standard soft gelatin capsules.

Example 57

Tablets for oral administration are prepared by mixing 50 milligrams of the active ingredient of Example 55, 2.5 milligrams of gelatin, 2.5 milligrams of magnesium stearate and 100 milligrams of starch, and forming the mixture into tablets by a conventional tableting machine. Slow release pills and tablets can also be used.

Example 58

A parenteral composition suitable for administration by injection is prepared by dissolving 5% by weight of the active ingredient of Example 55 in 95% by volume of physiological saline and sterilizing the resultant solution by filtration. A buffer can be used if desired.

The preceding four examples can be repeated by substituting other compounds within the scope of this invention for the active ingredient of these examples.

The above and similar examples can be carried out in accordance with the teachings of this invention, as will be readily understood by persons skilled in the art, by substitution of components and amounts in place of those specified.

The foregoing detailed description has been given for clearness of understanding only and no unnecessary limitations are to be understood therefrom.

The invention claimed is:

1. A compound of the formula

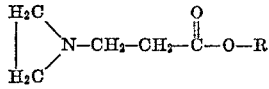

where R is selected from the group consisting of
 (1) aryl selected from the group consisting of phenyl, naphthyl, anthryl and phenanthryl;
 (2) alicyclic of 3 through 8 carbons;
 (3) heterocyclic where each ring has a total of 5 through 6 atoms of which 1 through 2 are each selected from the group consisting of nitrogen, oxygen and sulfur and the remainder are carbons;
 (4) substituted alkyl where the alkyl group has 1 through 22 carbons and the substituents are each selected from the group consisting of aryl as defined above; aryloxy where the aryl portion is as defined above; alicyclic as defined above; heterocyclic as defined above; halogen; nitro; alkylthio of 1 through 6 carbons; alkoxy of 1 through 6 carbons; carboalkoxy where the alkoxy portion has 1 through 6 carbons; alkylsulfonyl of 1 through 6 carbons; cyano; amino; monoalkylamino of 1 through 4 carbons; and dialkylamino where each alkyl has 1 through 4 carbons;
 (5) unsaturated aliphatic selected from the group consisting of alkenyl of 2 through 22 carbons and alkynyl of 2 through 22 carbons; and substituted unsaturated aliphatic where the aliphatic portion is as just defined and the substituents are the same as defined above for those in substituted alkyl; and where R in any of (1) through (5) contains a cyclic portion, said cyclic portion can be substituted with 1 through 3 members selected from the group consisting of alkyl of 1 through 4 carbons; alkoxy of 1 through 4 carbons; halogen; alkylthio of 1 through 4 carbons; alkylsulfonyl of 1 through 4 carbons; carboalkoxy where the alkoxy portion has 1 through 6 carbons; haloalkyl of 1 through 4 carbons; amino; monoalkylamino of 1 through 4 carbons; dialkylamino where each alkyl is of 1 through 4 carbons; haloalkylamino of 1 through 4 carbons; di(haloalkyl)amino of 1 through 4 carbons; cyano; and acetoxy where the aliphatic moiety has 1 through 6 carbons.

2. 1-aziridinepropionic acid, 2,2,2-trifluoroethyl ester.
3. 1-aziridinepropionic acid, 2-diethylaminoethyl ester.
4. 1-aziridinepropionic acid, cyclohexyl ester.
5. 1-aziridinepropionic acid, benzyl ester.
6. 1-aziridinepropionic acid, 2-methoxyethyl ester.
7. 1-aziridinepropionic acid, 2,2,3,3-tetrafluoropropyl ester.
8. 1-aziridinepropionic acid, 2-cyanoethyl ester.
9. 1-aziridinepropionic acid, ester with 3-hydroxy-N-methylpiperidine.
10. 1-aziridinepropionic acid, 2,2,3,3,4,4,4-heptafluorobutyl ester.
11. 1-aziridinepropionic acid, 2-dimethylaminoethyl ester.
12. 1-aziridinepropionic acid, 2-methylthioethyl ester.
13. 1-aziridinepropionic acid, 2,2,3,3,3-pentafluoropropyl ester.
14. The method of effecting depression of the central nervous system which comprises administering to a warm-blooded animal a pharmaceutically effective amount of a compound as defined in claim 1.
15. A composition comprising a compound as set forth in claim 1 and a major amount of a non-toxic pharmaceutical carrier therefor.

References Cited

Chemical Abstracts Sixth Collective Index, vol. 51–5; 1957–1961 (p. 1249s).

LELAND A. SEBASTIAN, Primary Examiner

U.S. Cl. X.R.

260—239; 424—267, 305

Notice of Adverse Decisions in Interferences

In Interference No. 98,349 involving Patent No. 3,457,349, A. G. Jelinek, ESTERS OF 1-AZIRIDINEPROPIONIC ACID AS TRANQUILIZERS, final judgment adverse to the patentee was rendered Sept. 12, 1973, as to claim 7.

[*Official Gazette December 25, 1973.*]